Patented Feb. 28, 1939

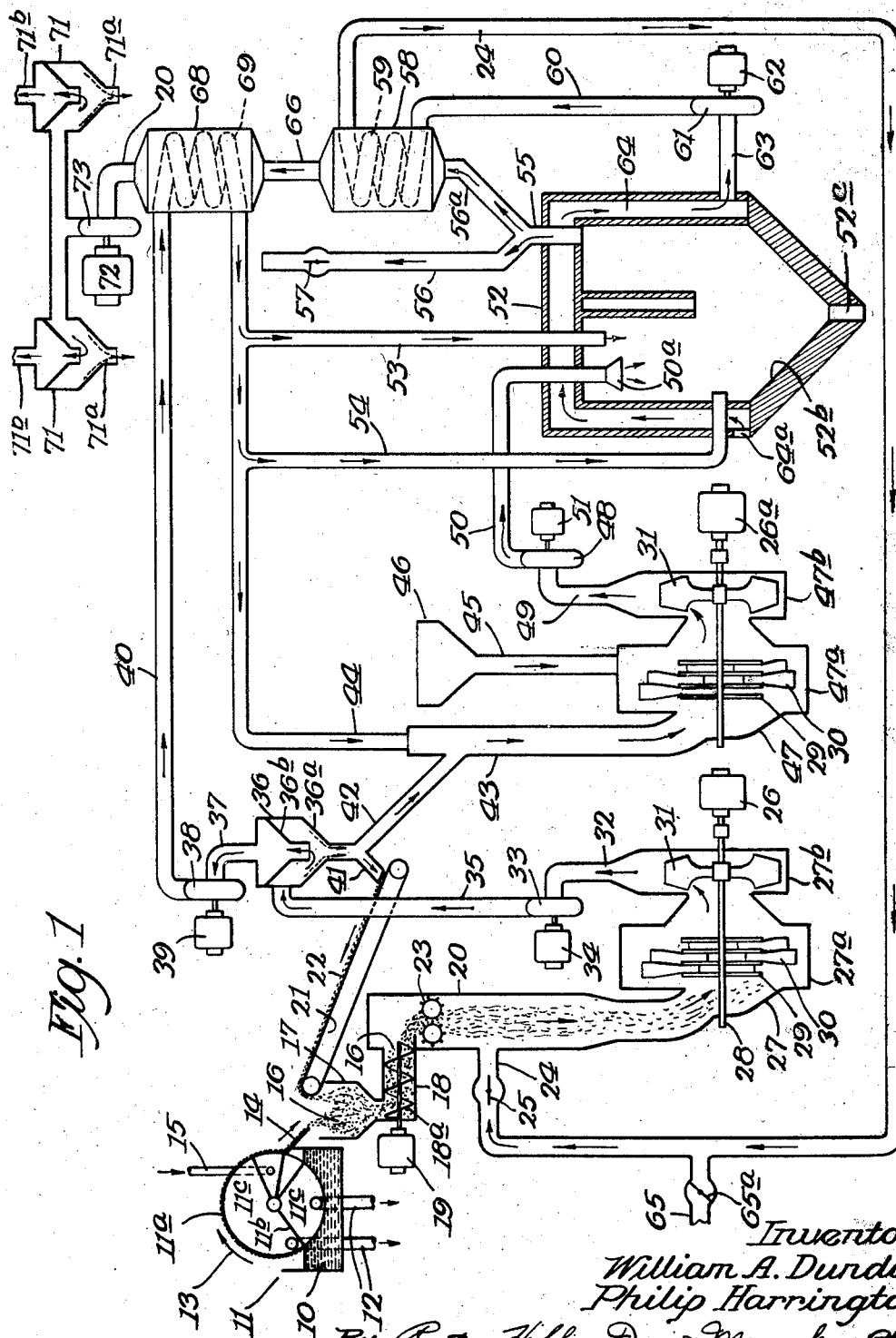

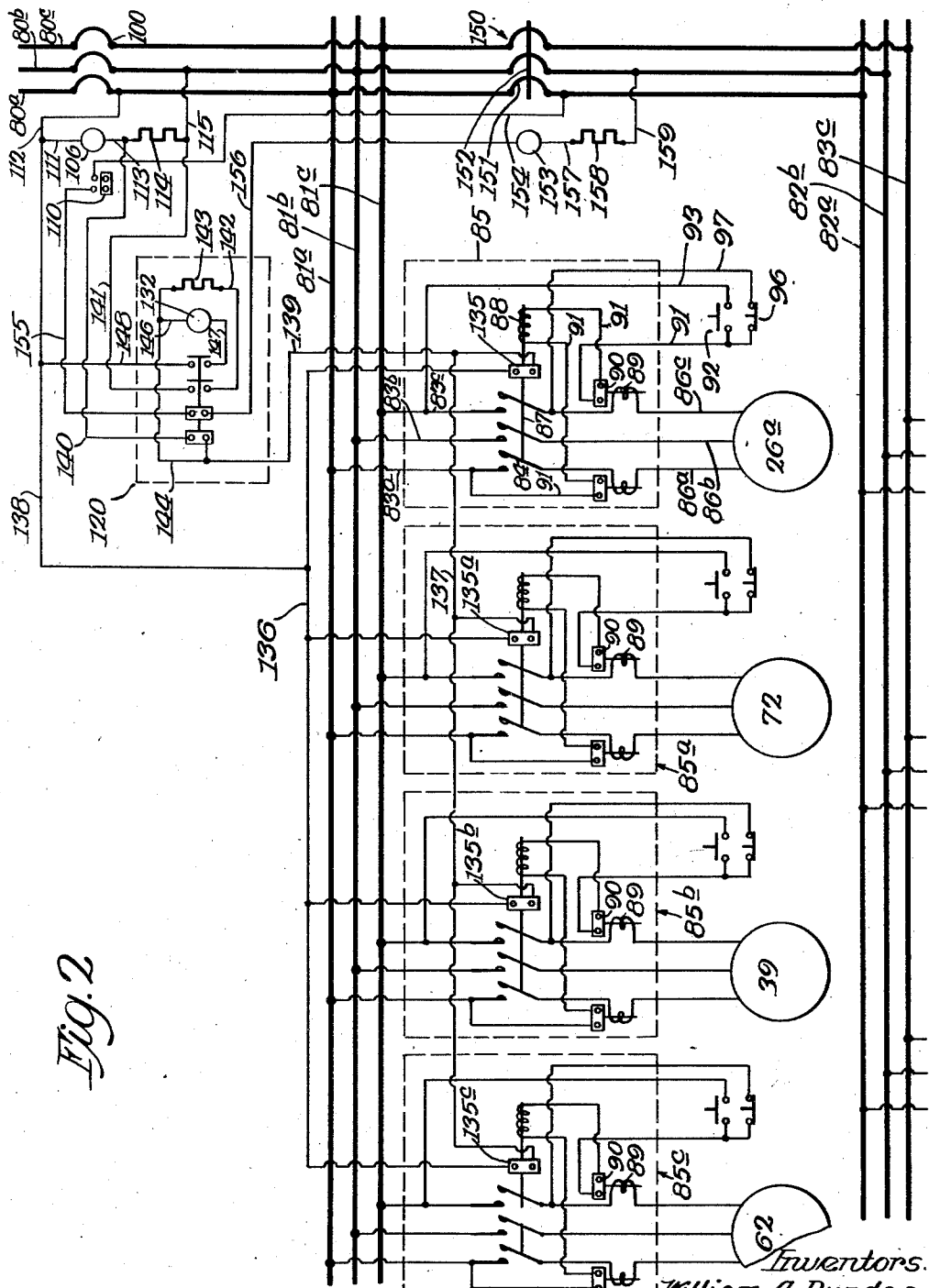

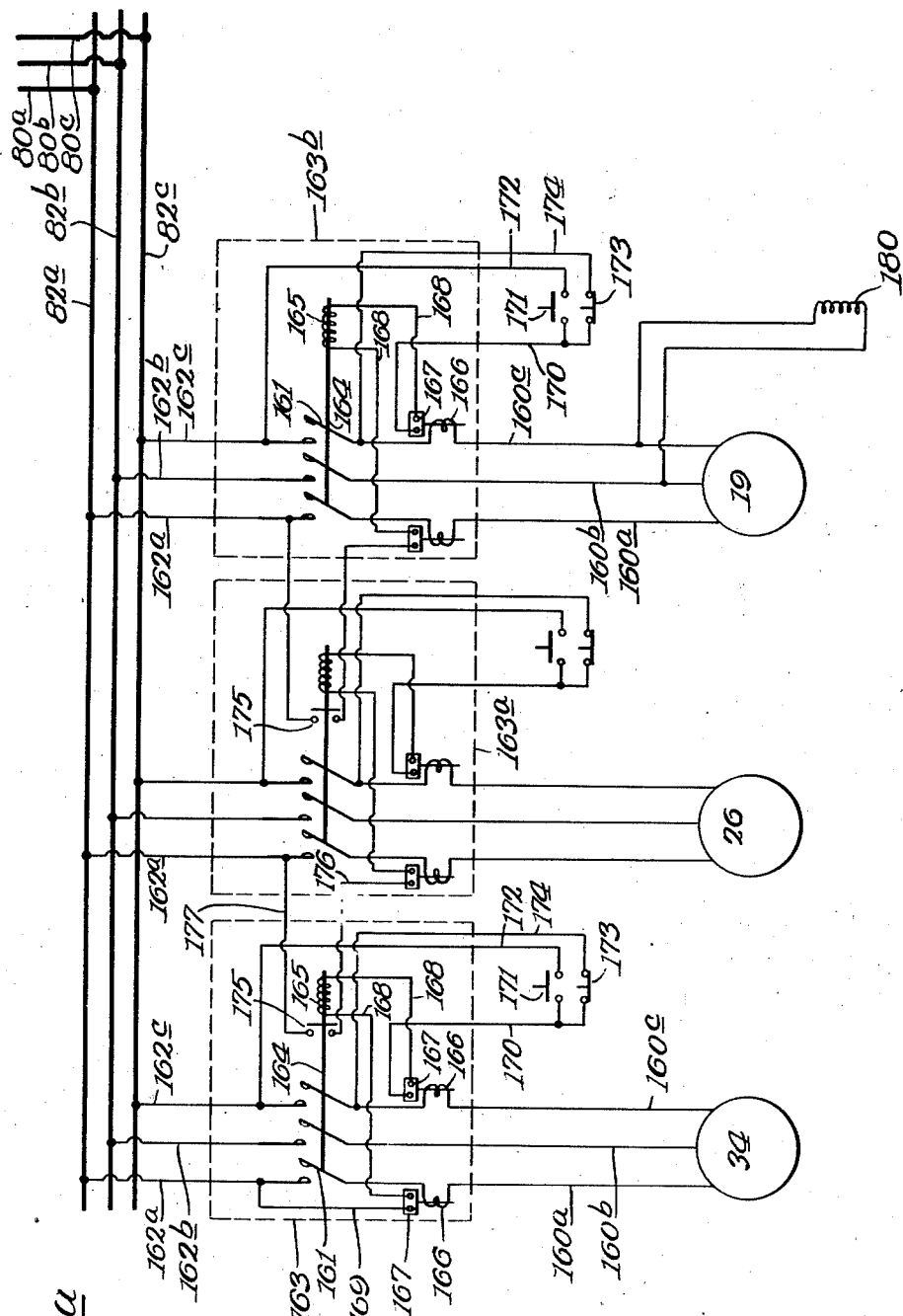

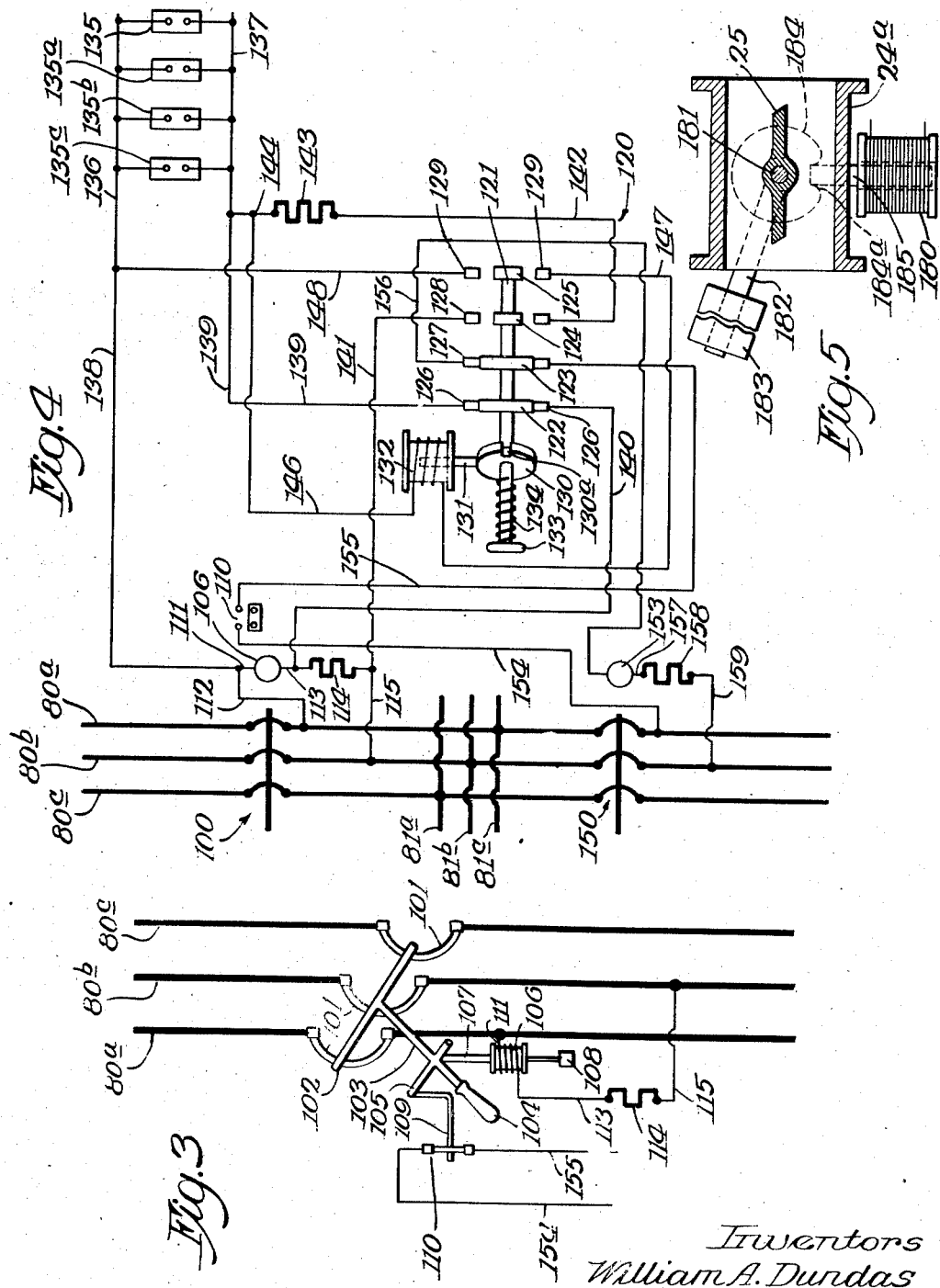

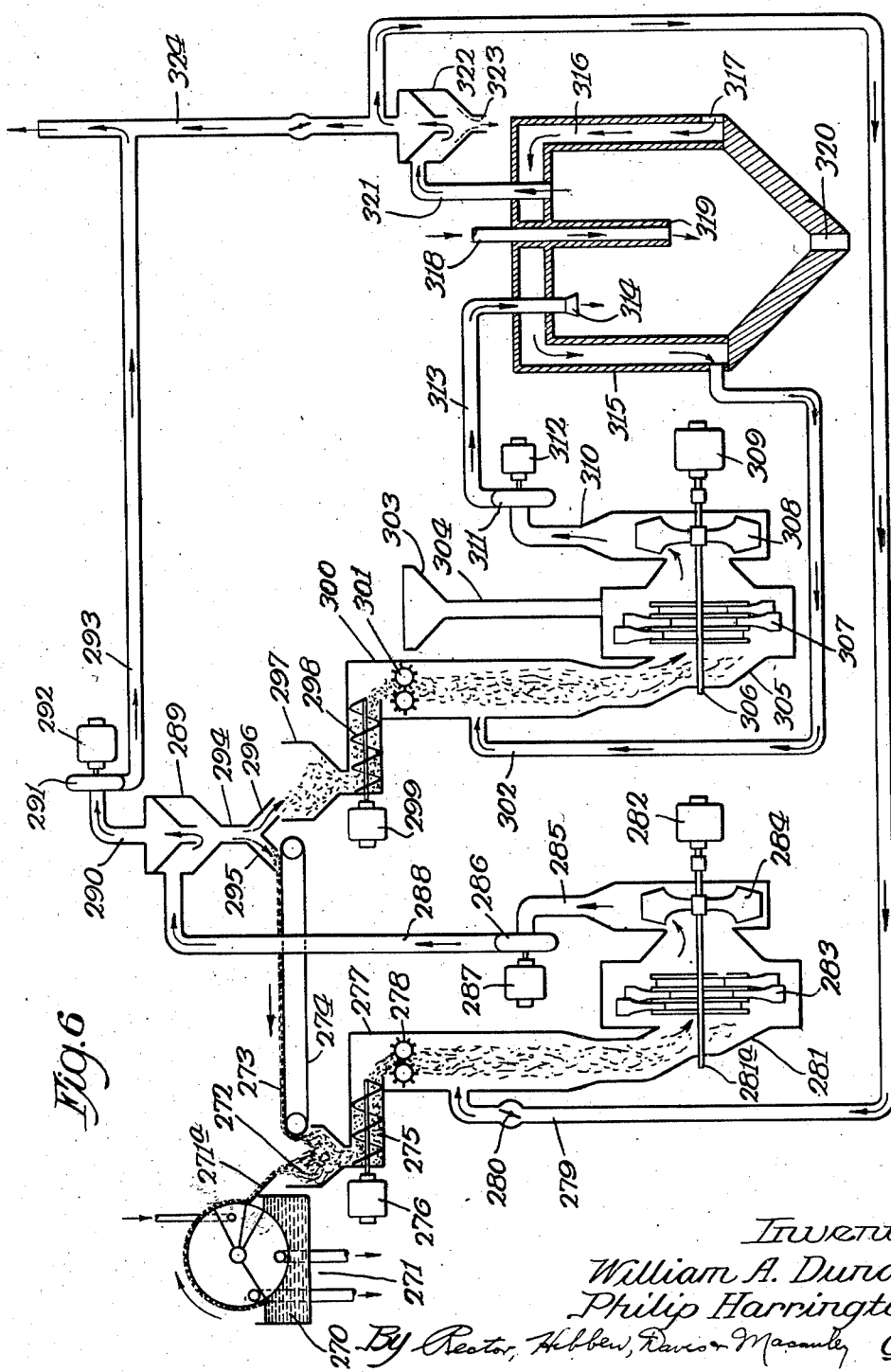

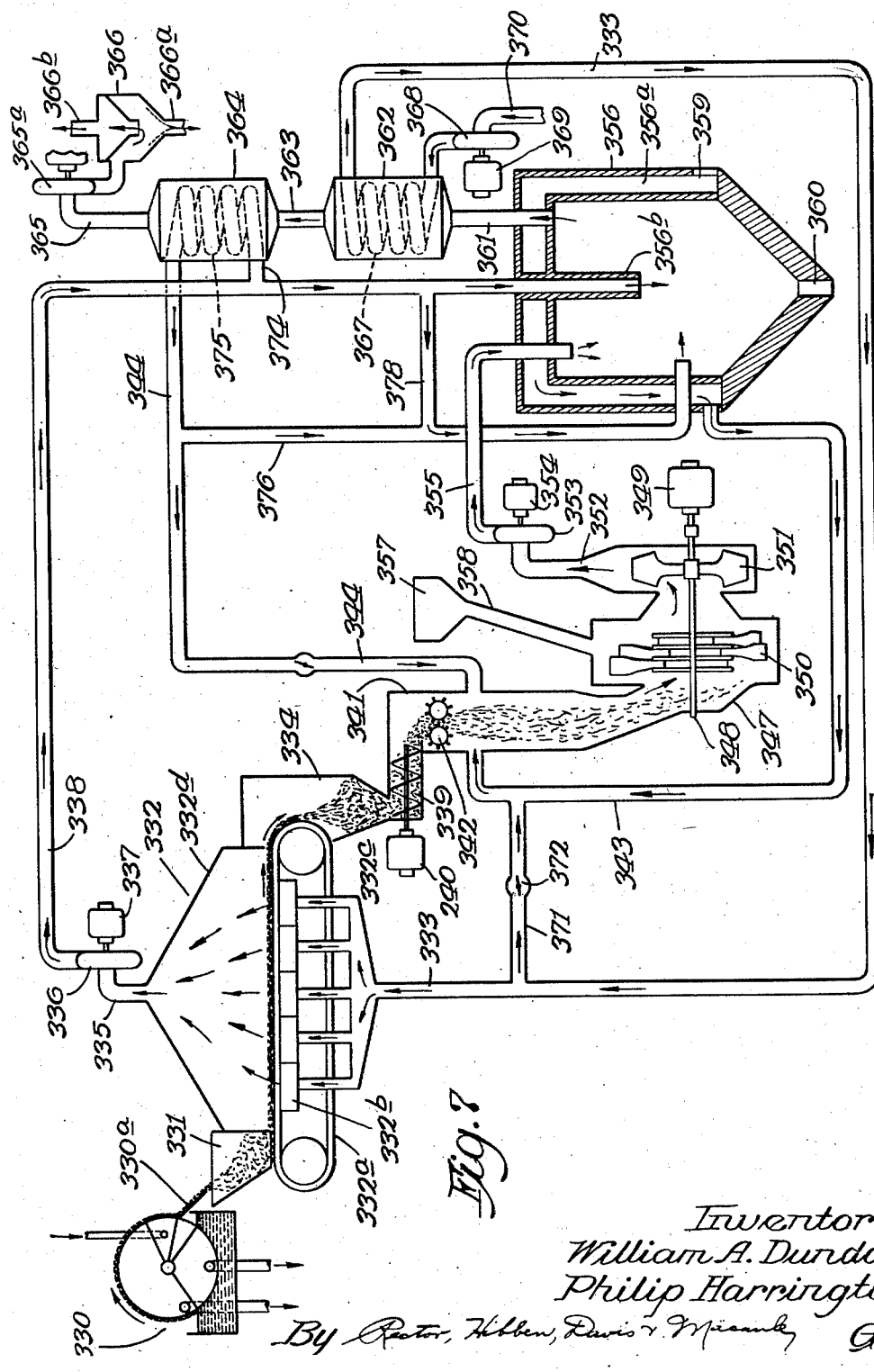

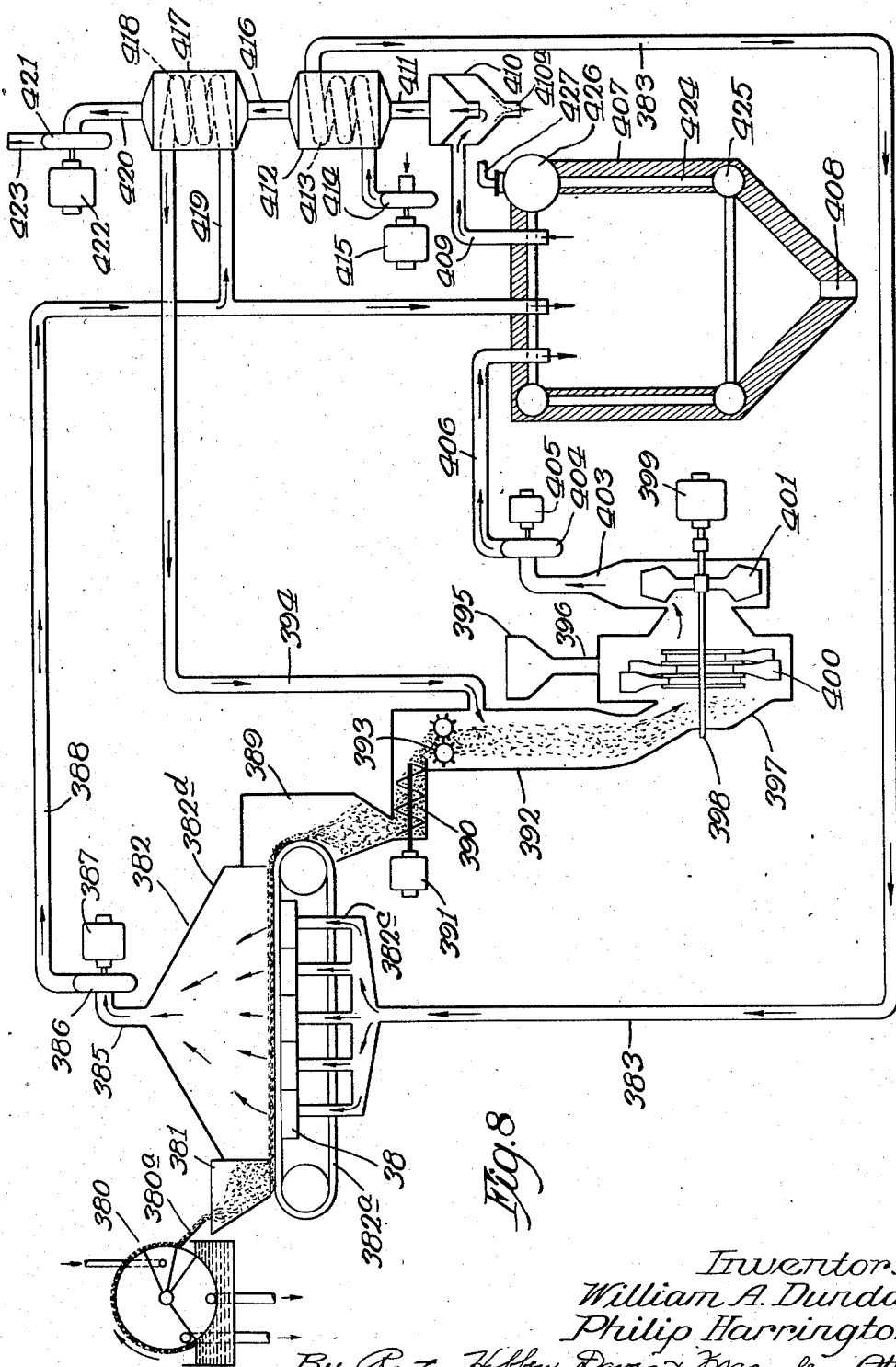

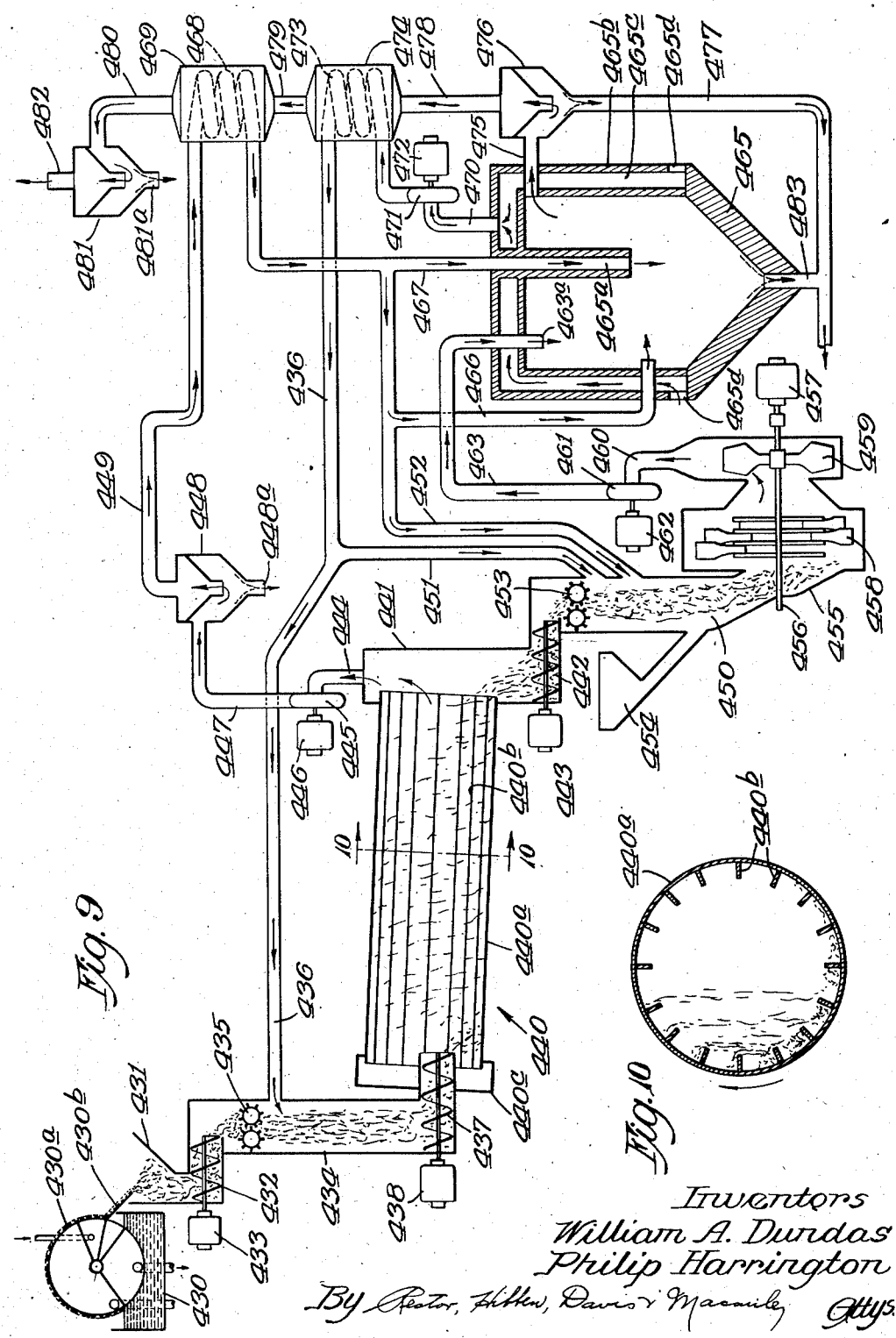

2,148,447

UNITED STATES PATENT OFFICE 2,148,447

METHOD OF AND APPARATUS FOR DISPOSING OF SEWAGE WASTE

William A. Dundas, Winnetka, and Philip Harrington, Wilmette, Ill.

Application August 26, 1933, Serial No. 686,926

59 Claims. (Cl. 110—15)

This invention relates to improvements in methods of and apparatus for the disposal of sewage wastes and its purpose is to provide means for accomplishing this object more efficiently and economically than it has heretofore been done by the methods commonly in use. Although particularly adapted for the treatment of sewage waste, the invention may be employed in the disposal of garbage, rubbish and other municipal wastes or other wastes and the like, or mixtures thereof. Sewage consists of a mixture of water, minerals and other inert inorganic materials and organic materials either in suspension or solution and garbage and rubbish are similar in that they usually include mixtures of organic and inorganic material and water. The problem of sewage disposal involves the separation of the water from the more or less solid ingredients and the disposition of these solid ingredients in an economical manner without creating a nuisance in the region where the operation is carried on. All presently known methods for the purification and treatment of sewage and the disposal of the waste products of such methods consist of separating more or less perfectly the water from the other materials contained in the sewage after which the water is ordinarily run off to open streams or bodies of water and the other separated materials are disposed of in various ways. These waste materials, commonly known as sludge, screenings and grit, consist of the inorganic and organic ingredients of the sewage together with some water which has not been separated by the initial treatment. The organic materials consist mainly of vegetable and animal matter, including a large percentage of volatile and combustible material, while the inorganic materials are largely in the form of inert minerals. These more or less solid ingredients of the sewage are ordinarily disposed of either by mechanical dewatering and processing into fertilizer for which the market is limited, or by digestion followed by partial dewatering carried on in drying beds and again followed by dumping on waste land, or by partial digestion and evaporation in lagoons, or by dumping the material at sea or in open rivers and lakes. Where the sewage wastes are disposed of in lagoons or on drying beds, the disposal is usually uncertain, seasonal and intermittent, being dependent upon weather conditions and requiring the storage of the sewage waste for long periods before it can be spread out on the drying beds for the evaporation of the water carried therein. In addition, these methods of disposal of the organic and inorganic ingredients of the sewage waste do not reduce the materials to an inert form and are unsanitary and give rise to the possibility of undesirable odors and nuisances over large areas. None of these methods fully utilizes the combustible properties or contents found in all sewage waste materials, and which are found in the waste materials in sufficient quantity to make them practically capable of supporting combustion without the addition of any appreciable quantities of supplementary fuel when incinerated by the methods described in the following specification.

The principal object of the present invention is to provide an improved method of and apparatus for disposing of sewage waste according to which the process of disposal is carried on economically and continuously with the reduction of the solid matter to an inert form of small volume and with the complete destruction of all offensive odors. A further object of the invention is to provide an improved process of sewage waste disposal according to which the waste materials are treated continuously, being subjected to a dewatering step and then being disposed of by incineration, leaving only the inert ash, and the gases of combustion, which are preferably utilized in drying the materials prior to the incineration thereof. A further object of the invention is to provide a method of sewage waste disposal in which the water content of the waste material is reduced mechanically and thermally preliminary to pulverizing and heating the solid ingredients of the waste in preparation for the burning of these ingredients in a closed chamber from which the gases of combustion are carried to points where their heat is utilized in effecting the drying of the waste materials in an early stage of the process. In this invention, the arrangement is preferably such that no gases of combustion or steam produced by thermal dewatering are permitted to escape to the atmosphere without passing through a high temperature zone for complete destruction of possible odors. A further feature of the invention is to provide an improved method of sewage waste disposal involving the incineration of the major portion of the solid ingredients of the sewage and the maintenance of the combustion by these ingredients alone or by the mixture therewith of comparatively small quantities of fuel such as coal, oil or gas. Still another object of the invention is to provide improved forms of apparatus for use in carrying on various steps of the improved process of the present invention. Other objects relate to various features of construction and arrangement of the apparatus and to details of the method which will appear more fully hereinafter.

The nature of the invention will be understood from the following specification taken with the accompanying drawings in which several embodiments of the improved method of the present invention are illustrated in connection with various forms of apparatus which may be employed in practicing the method. In the drawings, Fig. 1 shows a somewhat diagrammatic view of the principal parts of the apparatus and the connections therefor which may preferably be employed in practicing the improved method of the present invention;

Fig. 2 is a somewhat diagrammatic representation of the electrical connections of the various motors which are shown in Fig. 1 for driving different parts of the apparatus whereby an interlocking system is provided for controlling the operation of the motors;

Fig. 2a is a continuation of the diagrammatic showing of Fig. 2, illustrating the electrical connections to other motors included in the sludge disposal system illustrated in Fig. 1;

Fig. 3 is an enlarged diagrammatic representation of certain circuit breakers illustrated in Fig. 2;

Fig. 4 represents an enlargement of a portion of Fig. 2, illustrating somewhat in detail the parts of the reset relay;

Fig. 5 is an enlarged vertical section through a portion of the hot gas conduit leading to the drying tower shown in Fig. 1, illustrating the means for controlling the closing of a damper therein;

Fig. 6 is a diagrammatic view showing the apparatus used for practicing the invention according to another modification;

Fig. 7 is a diagrammatic view showing still another modification of the apparatus and method of the present invention;

Fig. 8 is a diagrammatic view showing still another modification of the invention;

Fig. 9 is a diagrammatic view showing the means for practicing the present invention with the use of a rotary drying kiln for heating and drying the sludge in the first stage of the operation;

Fig. 10 is an enlarged section taken on the line 10—10 of Fig. 9.

The apparatus to be used in the practice of the present invention is, in general, of standard make or design but where special forms of apparatus are preferably to be employed, such forms are illustrated and described in greater detail than are those parts which form the principal elements in the somewhat diagrammatic illustrations of the drawings. Referring to the form of the invention illustrated in Fig. 1, the sewage waste material 10, which may contain from one to twenty percent by weight of solid matter, after mixing with a suitable conditioner or coagulant such as ferric chloride, is introduced into a dewatering apparatus, for example, into the tank of a rotary filter 11 of the vacuum type which comprises a cloth covered cylindrical drum 11a, partially submerged in the material 10 contained within the tank and mounted for rotation about a horizontal axis. The space within the cylinder 11a is divided into chambers by division walls 11b and a connection is made with suction pipes 12 so that a partial vacuum may be maintained in each of the chambers 11c of the drum during its rotation. This vacuum connection is ordinarily made through the hollow shaft of the drum but is illustrated diagrammatically as being established by suction pipes leading to the separate chambers when the chambers are in certain positions with respect to the tank in which the sewage waste is contained. As the drum rotates through the tank, the suction causes the solid material of the sewage waste to be separated from the water and deposited upon the cylindrical surface of the drum and when one of the chambers is carried above the surface of the fluid by the rotation of the drum in the direction of the arrow 13, the suction serves to draw the water out of the waste material while at the same time causing it to adhere to the drum until it reaches a point where it engages an inclined scraper blade 14. At this point, the chamber located within that portion of the cylindrical space of the drum establishes a fluid-tight connection with the air pipe 15 which creates a pressure in the chamber and assists the blade 14 in removing the solid waste material 16 which then falls by gravity into a hopper 17. If desired, other forms of dewatering apparatus, such as presses, centrifuges and traveling screens, may be employed in place of the rotary vacuum filter. A belt conveyor 21 is also arranged to discharge into the hopper 17 a quantity of dried or partially dried sewage waste 22 from a succeeding stage of the process. From the bottom of this hopper, the mixture of wet and dry waste material is moved through a conveyor tube 18 having mounted therein a screw conveyor 18a driven by a motor 19. The conveyor tube discharges the material into a drying tower 20 which is mounted in a vertical position. The incoming mixture of wet material 16 and dried material 22 is ground up by suitable devices such as a pair of rotary chopping devices 23, comprising rotary drums having radiating blades adapted to mesh with each other during the rotation of the drums as these drums are driven by power means, not shown. The waste materials are thus thoroughly mixed and more or less finely divided and they then drop by gravity through the tower 20 where they mingle with a stream of hot air introduced through the conduit 24 and heated to a high temperature, for example, 1500 degrees F., by heat developed in the incinerating stage of the process, as hereinafter set forth. The flow of heated air through this conduit 24 may be controlled by a valve 25. The mixture of the wet material with the hot air results in an exchange of heat to the colder material and a corresponding drop in temperature of the air which will be cooled to a point of safety for introduction into the mill, for example, about 800 or 900 degrees F.

The waste material then passes by gravity from the bottom of the tower 20 to a pulverizing and drying mill 27 comprising a main casing 27a and an auxiliary casing 27b having a horizontal shaft 28 journaled in the walls thereof. A plurality of disks 29 are secured on the shaft 28 within the main casing 27a and a series of beater arms 30 are pivotally mounted on these disks so that they fly out by centrifugal force and engage the incoming waste material with the result that it is pulverized to a finely divided state. The auxiliary casing 27b, which is in direct communication with the main casing 27a, contains a fan or impeller 31 which is fixed upon the shaft 28 and which serves to maintain a circulation of the mixture of air, solid matter and steam produced by evaporation through the casing 27 and also to discharge the finely divided material, air and steam upwardly through a conduit 32 as the shaft 28 is rotated by the electric motor 26. This conduit serves as the intake of a fan 33 which is driven by an electric motor 34 and which discharges the mixture upwardly through a conduit 35 into a centrifugal separating device 36 comprising a cone-shaped lower wall 36ª and a similarly shaped division wall 36ᵇ, each having a central outlet at its lower end or apex. The air and vapor contained in the mixture received through the conduit 35 is drawn upwardly through the division wall 36ᵇ and through a conduit 37 by a fan 38 which is driven by an electric motor 39 and which discharges the mixture of air and vapor through a conduit 40. The solid matter separated in the centrifugal separator 36 drops by gravity through the central opening of the lower cone-shaped wall 36ª with the result that a portion of it passes through the branch conduit 41 to the belt conveyor 21 previously described which serves to convey this dried or partially dried material to the hopper 17. The remaining portion of the material dropping from the separator 36 passes through another conduit 42 to the next stage of the process.

The conduit 42 discharges into the upper end of another drying tower 43 into which hot air is introduced through a conduit 44 communicating with its upper end. As the waste material drops through the tower 43, it mingles with and is further dried by the hot air introduced by the pipe 44 and it then discharges into a second rotary pulverizing mill 47 which is similar to the mill 27 previously described, comprising a main casing 47ª and an auxiliary casing 47ᵇ in which are mounted parts having the same form and bearing the same reference numbers as those described in connection with the mill 27. This mill 47 may also be provided with a branch conduit 45 leading from a hopper 46 which may contain lump coal, for example, adapted to be pulverized in the mill and mingled with the waste material for the purpose of assisting in maintaining combustion in the subsequent incinerating stage of the process. The beaters 30 in the casing 47ª which are driven by a motor 26ª effect a further subdivision and drying of the waste material as it is drawn through the mill 47 by the impeller 31. This impeller, and the fan 48, cause the material to pass upwardly through a conduit 49 and through the fan casing into a conduit 50, the fan being rotated by a motor 51. The conduit 50 discharges the material, under the pressure of the fan, into the upper end of a closed incinerating furnace 52. A conduit 53 leads through the top wall of the furnace and discharges adjacent the flared mouth 50ª of the conduit 50 for the purpose of supplying heated air for maintaining combustion of the powdered material and another conduit 54 is led through the side wall of the furnace to discharge at a point beneath the mouth 50ª of the conduit 50 for maintaining combustion in the lower part of the furnace chamber. The pulverized and dried waste material is thus burned while in suspension in the furnace chamber and the ash drops onto the lower wall 52ᵇ of the furnace which is constructed in the form of an inverted cone and which has an outlet 52ᶜ through which the inert ash is discharged by gravity to cars or pipes for final disposal.

The hot gases of combustion are discharged from the top of the furnace chamber through a conduit 55 which has a branch 56 leading to the atmosphere and controlled by a valve 57 which may be partially or wholly closed, depending upon the conditions of operation. Ordinarily, the hot gases of combustion or the principal portion thereof pass from the conduit 55 through a branch conduit 56ª which leads to a preheater 58. This preheater has mounted therein a hollow coil 59 which is connected by a conduit 60 with a fan 61 driven by a motor 62 and adapted to draw hot air through a conduit 63 from the chamber 64 formed within the hollow wall of the furnace 52. This chamber 64 has an inlet 64ª located opposite the conduit 63 so that when the fan 61 is in operation, air is drawn from the atmosphere through the wall of the furnace and is thereby heated before it reaches the fan 61. This air is then carried upwardly through the conduit 60 and is further heated by the hot gases of combustion which circulate around the coil 59 through the heater 58. Hot air from the coil 59 is then discharged through the previously described conduit 24 which leads to the drying tower 20. A cold air conduit 65 is preferably arranged to communicate with the conduit 24 adjacent the drying tower 20 and a damper 65ª may be provided in this cold air conduit for regulating the flow of cold air in order to maintain a substantially uniform temperature of the heated air which reaches the cooling tower through the conduit 24. If desired, the damper 57 in the waste gas conduit and the damper 65ª in the cold air conduit may be electrically controlled by means responsive to temperature conditions.

In addition to effecting the heating of the contents of the coil 59 within the preheater 58, the hot gases of combustion serve also to operate a second preheater and for this purpose they are carried upwardly through a conduit 66 from the preheater 58 to a superimposed preheater 68 having mounted therein a coil 69. The coil 69 is connected at one end to the previously described conduit 44 to which the branch conduits 53 and 54 are connected and at its other end the coil 69 is connected to the previously described conduit 40 so that this preheater serves to heat the air which is supplied to the furnace chamber and also the air which is supplied to the upper end of the drying tower 43. From the upper end of the chamber of the preheater 68, the gases of combustion are carried upwardly through a conduit 70, and introduced into one or more separators 71 which serve to separate from the gases the finely divided ash contained therein, allowing this ash to drop through the bottom of the separator as shown at 71ª while the gases are discharged from the upper end of the separator to the atmosphere, as shown at 71ᵇ. A motor 72 is preferably employed for driving a fan 73 connected in the conduit 70 for inducing a draft from the pre-heater chamber upwardly to the separator 71.

In Figs. 2 and 2ª there is illustrated, somewhat diagrammatically, one arrangement of electrical circuit connections and electrical apparatus which may be employed for providing an interlocking control of the motors shown in Fig. 1 for driving the conveyor, the first and second stage mills, the exhauster fans, the preheater fans and induced draft fans in order to prevent the clogging of either mill with wet sludge, the introduction of hot gases into an empty drying tower or mill or to prevent other undesirable results arising from the accidental stoppage of any motor in the illustrated system. For example, if the first mill 27 be accidentally shut down by reason of the stoppage of its motor 28, the electric motor 19 which drives the conveyor 18 is automatically shut down in order to prevent the feeding of wet sludge into the mill. At the same time that this occurs, the damper 25 is automatically closed in order to prevent the passage of highly heated gases into the drying tower 20 and into the mill 27. Also, if any of the preheater fans or induced draft fans are stopped by reason of the stoppage of their driving motors, the driving motors of the mills operating in conjunction with those fans and the driving motors of all conveyors and exhaust fans connected with those mills are automatically stopped in order to prevent wet sludge from entering and clogging the mills while the preheater and induced draft fans are out of service.

The electrical system illustrated in Figs. 2 and 2a by which the foregoing results and other advantages are obtained comprises three electrical conductors 80a, 80b and 80c leading from a source of three-phase current supply, the system being herein illustrated in connection with a three-phase alternating current system although it will be understood that the improvements of the present invention may be practiced with a two-phase alternating current system or with a direct current system, if desired. These conductors supply current to two series of buses including a first series 81a, 81b and 81c and a second series 82a, 82b and 82c. The series of buses 81a, 81b and 81c supply current to the motors for driving the pre-heater fans, the induced draft fans and the second stage mill, while the buses 82a, 82b and 82c supply current to the motors for driving the conveyor, the first mill and the exhauster. Referring first to the electrical connections to the motor 26a by which the second stage mill is operated, the buses 81a, 81b and 81c are connected to the motor through three conductors 83a, 83b and 83c, respectively, which in turn are connected through the contactors 84 of a motor starter 85 with the conductors 86a, 86b and 86c having connections with the terminals of the motor 26a. The motor starter 85 has its contactors 84 connected for operation by a rod 87 which is actuated by a series of mechanical connections leading to a closing coil 88. This closing coil is connected across one phase of the circuit through overload relay coils 89, contacts 90, conductors 91, momentary contacting push button 92 and conductor 93. Upon momentarily closing the push button 92, the closing coil 88 is energized and the rod 87 is operated to close the contactors 84 and thereby complete the circuit from the buses 81a, 91b and 81c of the motor 26a. The circuit thus established is maintained by reason of the fact that a normally closed push button contact 96 establishes a connection from one of the conductors 91 to the conductor 86c to which the conductor 97 is connected, thus maintaining a circuit through the coil 88 and holding the contactors 84 in their closed positions. In case of an overload on the motor 26a, the excess current passes through each of the conductors 86a and 86c with the result that the coils of the overload relays 89 operate the contacts 90 to open them and thereby deenergize the coil 88, with the result that the contactors 84 are automatically moved to their open positions, thereby opening the motor circuit. In a similar way and by similar connections and parts bearing the same reference numerals, motor starters 85a, 85b and 85c are employed for establishing connections to and controlling the starting of the electric motors 72, 39 and 62, respectively, which are employed for driving the induced draft fans, the second preheater fan and the first preheater fan, respectively.

When the system is running under normal conditions, the supply circuit is maintained in closed position by a circuit breaker 100 which is illustrated diagramatically in Fig. 2 and shown in somewhat greater detail in Fig. 3. This circuit breaker comprises three carbon and copper contacts 101 which are carried by a common bar 102 having an operating lever 103 provided with a handle 104. The lever 103 is mounted on a shaft 105 which is adapted to pivot about its axis when the contacts 101 are moved toward and from their closed positions. The contacts 101 are adapted to be held in closed position by a coil 106 which, when its circuit is energized, causes a latch member 107 to engage parts associated with the shaft 105 to hold it from turning. When the coil 106 is deenergized, the latch member 107 moves downwardly under the influence of a weight 108, thereby allowing the lever 103 with its contact member 101 to move to open position. The shaft 105 has mechanical connections with an arm 109 which operates the auxiliary contacts 110 located in an auxiliary circuit, hereinafter described. The coil 106 is connected across one phase of the supply circuit by means of a conductor 111 connected to another conductor 112 having connection with one of the supply conductors 80a, and another conductor 113 leading through a resistor 114 and the conductor 115 which is connected to another supply conductor 80b. When this circuit is established, the coil 106 is energized and the circuit breaker is maintained in its closed position.

The circuit breaker 100 is interlocked with the circuits of the motor starters 85, 85a, 85b and 85c through a reset relay 120, the connections and mechanical features of which are illustrated somewhat diagrammatically in Fig. 4 in addition to the general illustration of Fig. 2. The reset relay comprises a shaft 121 having mounted upon it four contact members 122, 123, 124 and 125 which are adapted in certain positions to establish connections between opposed pairs of stationary contacts 126, 127, 128 and 129, respectively. Two of the contact members 124 and 125 are connected at right angles to the other two contact members 122 and 123 so that when two of the pairs of stationary contact members are connected by the movable contact members, the other two pairs of contact members are disconnected. The shaft 121 is provided with a relatively fixed cam 130 having a notch 130a adapted to be engaged by the plunger 131 of a magnetizable coil 132 which, when it is energized, withdraws the plunger 131 to permit the cam and the shaft 121 to be rotated. When the coil 132 is deenergized, the plunger 131 is permitted to fall by gravity into the notch 130a, thereby holding the cam and shaft 121 against rotation, assuming that the cam 130 has previously been rotated to a position where the notch 130a is in alignment with the plunger. The turning of the cam for this purpose is effected by a handle 133 having a connection with a coil spring 134 which operates automatically to return the shaft 121 and the contact bars to the position shown in Fig. 4 when the coil 132 is energized to elevate the plunger 131.

When any one of the motors 26a, 39, 62 or 72 is thrown out of operation by any one or more of the circuit breakers heretofore described, the coil 106 of the circuit breaker 100 is automatically short-circuited through electrical connections which are made with contacts adapted to be controlled by the deenergizing of the coils 88 when the circuit of the associated motor is opened and, to eliminate the short circuit thus established and permit the circuit breaker 100 to be again closed, the reset relay 120 is operated. Before describing the operation of the reset relay reference will be made to the circuits by which the coil 106 of the circuit breaker 100 is short-circuited. This short-circuiting may be effected by any one of a series of contacts 135, 135ª, 135ᵇ and 135ᶜ which are associated with the coils 88 of the motor starters 85, 85ª, 85ᵇ and 85ᶜ, respectively. These contacts 135 are connected in parallel by conductors 136 and 137 and the conductors 136 and 137 are in turn connected on opposite sides of the coil 106 to a conductor 138 leading to the conductors 111 and 112, and another conductor 139 which leads to one of the stationary contacts 126 of the reset relay. The other stationary contact 126 is connected through a conductor 140 with the conductor 113 which connects the coil 106 with the resistor 114 previously described. When the reset relay is in the position shown in Fig. 4, with the contact member 122 establishing a connection between the stationary contacts 126, the closing of the contacts 135 of the motor starter 85, by the deenergizing of the coil 88 associated with that motor starter, brings about a short-circuiting of the coil 106 with the result that the contact members 101 of the circuit breaker 100 are automatically opened. Assuming that the contact members 101 are in open position, which is the position they would have when the sludge disposal system is not in operation, the first step to be taken to eliminate the short circuit and permit the closing of the circuit breaker 100 is to turn the handle 133 of the reset relay, thereby rotating the shaft 121 through ninety degrees from the position shown in Fig. 4 until the contact member 122 breaks the connection between the stationary contacts 126. At the same time that the contact member 122 passes out of connection with the stationary contacts 126, the contact member 123 becomes disengaged from the contacts 127 and the other two movable contacts 124 and 125 establish connections between the other two pairs of stationary contacts 128 and 129, respectively. With the opening of the connection between the contacts 126 by the rotation of the handle 133, the short circuit of the coil 106 is eliminated so that when the contacts 101 are closed by manipulation of the handle 104, the coil 106 may be energized and then operates the latch 107 to hold the circuit breaker in its closed position.

To prevent the reset relay 120 from returning automatically to its normal position after it has just been operated after the manner described in the preceding paragraph, the movable contacts 124 and 125 and their associated stationary contacts 128 and 129, respectively, with their connected circuits, are provided. The upper contact member 128 is connected by a conductor 141 with the conductor 115 previously described and the lower contact member 128 is connected by a conductor 142 with a resistor 143 which is in turn connected through a conductor 144 with the conductor 139. The conductor 144 is also connected through a conductor 146 with one terminal of the coil 132. The other terminal of the coil 132 is connected through a conductor 147 with the lower stationary contact 129. The upper stationary contact member 129 is connected through a conductor 148 with the conductor 138 previously described. As long as any one of the auxiliary contacts 135, 135ª, 135ᵇ or 135ᶜ is closed, the current will flow from the line conductor 80ª through conductors 112, 138, contact 135, conductors 137 and 139, conductor 144, resistor 143, conductor 142, contacts 128 and 124 and conductor 141 back to the conductor 115 and line conductor 80ᵇ previously described, thereby short-circuiting the coil 132 and preventing the energizing of this coil to release the cam 130 and permit the shaft 121 to be returned to its normal position.

Assuming that one or more of the motors 26ª, 39, 62 and 72 have been stopped, with the reset relay in the condition heretofore described, and that all of these motors have subsequently been started in operation again with a resulting opening of all of the contacts 135, 135ª, 135ᵇ and 135ᶜ, it is then necessary to energize the coil 132 to effect the resetting of the relay 120 and this is brought about by a flow of current from the line conductor 80ª through conductors 112, 138, 148, contacts 129 and 125, conductor 147, coil 132, conductor 146, conductor 144, resistor 143, conductor 142, contacts 124 and 128, conductor 141 and conductor 115 back to line conductor 80ᵇ. When the coil 132 is thus energized, the plunger 131 is elevated and the cam 130 and shaft 121 are permitted to return to the normal position shown in Fig. 4 under the influence of the coil spring 134.

In order to prevent the starting of the motors 19, 26 or 34 or any other motors connected to the buses 82ª, 82ᵇ and 82ᶜ before all of the motors 26ª, 39, 62 and 72 have been started in operation, a circuit breaker 150 is connected in the line conductors 80ª, 80ᵇ and 80ᶜ at a point between the connections which are made to the buses 81ª, 81ᵇ and 81ᶜ and the connections which are made to the buses 82ª, 82ᵇ, 82ᶜ. This circuit breaker 150 is similar in construction to the circuit breaker 100 and comprises a series of contact members 151 which are carried by a bar 152 and controlled by a coil 153. For the purpose of energizing the coil 153 of the circuit breaker 150, connections are made with the line conductors including the connection from the conductor 80ª through the conductor 154 which is connected with the previously described contacts 110 which are controlled by the actuation of the circuit breaker 100. The other terminal of the contacts 110 is connected to a conductor 155 with the upper contact 127 in the reset relay. The lower contact 127 is connected to a conductor 156 with one terminal of the coil 153. The other terminal of the coil 153 is connected by a conductor 157 with a resistor 158 which is in turn connected through a conductor 159 with the line conductor 80ᵇ. As a result of the connections just described, the coil 153 is connected in the closed circuit between the conductors 80ª and 80ᵇ at the time that the reset relay 120 has been reset following the opening of all of the contacts 135, 135ª, 135ᵇ and 135ᶜ and the starting of all of the motors 26ª, 39, 62 and 72 so that the circuit breaker 150 may then be operated to close the circuit leading to the buses 82ª, 82ᵇ and 82ᶜ with the result that when this circuit breaker 150 is closed, the coil 153 will be energized and will latch this circuit breaker in its closed position. It will be apparent from the foregoing description that the circuit breaker 150 cannot be closed in the manner just described until after the previous closing of the circuit breaker 100 with the resulting operation of closing the contacts 110.

When the circuit breaker 150 is closed, current is permitted to flow through the buses 82ª, 82ᵇ and 82ᶜ to which the motor 19 for driving the conveyor 18, the motor 26 for driving the first mill 27 and the motor 34 for driving the exhauster fan 33 are connected, as shown in Fig. 2ª. All of these motors are connected to the buses 82ª, 82ᵇ and 82ᶜ in the same manner and a description of one set of these devices will therefore suffice for all of them. For illustration, the motor 34 is connected through conductors 160ª, 160ᵇ and 160ᶜ with contact members 161 which are adapted to establish connections with conductors 162ª, 162ᵇ and 162ᶜ which are in turn connected to the buses 82ª, 82ᵇ and 82ᶜ, respectively. The contactors 161 constitute parts of the motor starter 163 which is substantially similar to the motor starter 85 previously described except that the connections are somewhat different, as will now be pointed out. The contactors 161 of the starter 163 are operated by a rod 164 which has operating connections with a member located within and actuated by the coil 165, corresponding to the coil 88 previously described. The conductors 162ª and 162ᶜ have connected therein overload coils 166 which correspond to the overload coils 89 of the construction previously described. These overload coils 166 control contacts 167 corresponding to the contacts 90. One terminal of each set of contacts 167 is connected through a conductor 168 with one of the terminals of the coil 165. The other terminal of one set of contacts 167 is connected by a conductor 169 with the conductor 162ª and the other terminal of one set of contacts 167 is connected by conductor 170 through a momentary push button contact 171 to a conductor 172 which leads to the conductor 162ᶜ. The conductor 170 is also connected through a normally closed push button switch 173 with a conductor 174 which leads to the conductor 160ᶜ so that a circuit is maintained through the coil 165 after the contacts 161 have been closed, thus permitting the motor 34 to be maintained in operation.

The motor 26 for driving the mill 27 is controlled in its operation by a starter 163ª and the motor 19 for driving the conveyor 18 is controlled by a starter 163ᵇ. These starters 163ª and 163ᵇ are similar to the starter 163 except that interlocking connections are provided so that the starter 163ª cannot be operated until the starter 163 has been actuated to start the motor 34 and the starter 163ᵇ cannot be operated to start the motor 19 until the starter 163ª has been started to actuate the motor 26. For the purpose of providing this interlocking connection, there is substituted for the conductor 169 in each of the starters 163ª and 163ᵇ a connection leading through contacts 175 which are controlled by the actuation of the contactors 161 of the adjacent motor starter. For example, on the starter 163, the contacts 175 are connected by one conductor 176 with the contacts 167 of the starter 163ª corresponding to the contact to which the conductor 169 is connected in the starter 163, and the other terminal of the contacts 175 is connected through a conductor 177 with the conductor 162ª leading to the starter 163ª so that it is necessary to actuate the starter 163 to close the circuit of the motor 34 and to close the contact 175 before the starter 163ª can be actuated to establish a circuit through its coil 165. Similar connections are made from the starter 163ᵇ to the contacts 175 of the starter 163ª so that the starter 163ª must be actuated to close the circuit of the motor 26 before the starter 163ᵇ may be actuated to close the circuit of the motor 19 and establish a circuit through the coil 165 of that starter.

In order to prevent the flow of hot gases into the drying tower 20 and the mill 27 in case any one of the motors 19, 26 or 34 is shut down, the closing of the damper 25 in the conduit 24 is automatically controlled by a coil 180 which is connected between two of the conductors 160ᵇ and 160ᶜ leading to the motor 19, as shown in Fig. 2ª. As shown in Fig. 5, the damper 25 is mounted on a shaft 181 located in a section 24ª of the conduit and this shaft is provided with an arm 182 carrying a weight 183 which tends normally to close the damper. After the damper has been manually opened, it is adapted to be held in that open position by means of a cam 184 secured on the shaft 181 and having a notch 184ª adapted to be engaged by a plunger 185 which serves as a latch member and which operates as the core of the coil 180. When the coil 180 is energized, during the time that the circuit to the motor 19 is closed, the plunger 185 is held in its upper position as shown in Fig. 5, so that it engages the notch 184ª and holds the damper in its open position. If the operation of the motor 19 is arrested and its circuit is automatically opened by the motor starter 163ᵇ, as heretofore described, the coil 180 is deenergized with the result that the plunger 185 falls by gravity and permits the cam 180 and the shaft 181 to be turned by the weight 183 to close the damper and shut off the flow of hot gas to the tower 20. It will be apparent that the same result will be brought about by the stopping of either of the motors 26 and 34 inasmuch as the stopping of the motor 26 automatically opens the circuit of the motor 19 and the stopping of the motor 34 also operates automatically to open the circuit of the motor 26.

In Fig. 6 of the drawings there is illustrated another form of apparatus for practicing the present invention. This form differs chiefly from that illustrated in Fig. 1 in that no preheaters are used for heating the gases introduced into the early stages of the process and no attempt is made to convey the gases from the waste to the furnace for the purpose of destroying the odors. As in the form of the invention previously described, the sludge material 270, containing a large percentage of water, is introduced into the tank of a vacuum type filter 271 having the form previously described. The solid material of the waste, containing some water, is removed from the rotary drum of the filter by the scraper 271ª and it drops into the hopper 272 into which a portion of dried sludge 273 is introduced by a belt conveyor 274. The mixture of wet and dried or partially dried waste passes from the hopper into the screw conveyor 275 which is driven by a motor 276. The screw conveyor discharges the material into the upper end of the drying tower 277 which is like that previously described, being provided adjacent its upper end with a pair of rotary chopping devices 278 which are adapted to reduce the waste to a finely divided state before it drops by gravity through the tower. Hot gases of combustion are introduced into the tower 277 through a conduit 279 which may be controlled by a damper 280, as in the other form of the invention. These hot gases have a drying effect upon the finely divided sludge dropping through the tower and are themselves reduced in temperature before the mixture reaches the rotary mill 281 which is like the mills previously described, being provided with a rotary shaft 281ª driven by a motor 282 and having mounted thereon in the main casing the beaters 283 and also an impeller 284 located in the auxiliary casing.

From the auxiliary casing of the rotary mill, the gases steam and finely divided solid material are carried upwardly through a conduit 285 which is connected with the intake of a rotary fan 286 driven by a motor 287. The fan 286 projects the materials upwardly through a conduit 288 which conveys them to the rotary separating device 289. The gases, vapors and the like are separated by the device 289 and pass upwardly through a conduit 290 which communicates with the intake of a fan 291 driven by a motor 292. The fan discharges these gases and vapors through a conduit 293 which is connected to deliver them as hereinafter described. The solid materials in the waste which are separated in the separating device 289 are delivered downwardly through a conduit 294 which communicates with two branch conduits. One branch conduit 295 deposits a portion of the finely divided and partially dried waste onto the belt conveyor 274 which conveys it to the hopper 272 as previously described. The other branch conduit 296 discharges the remaining portion of the partially dried waste into a hopper 297 by which it is delivered to a screw conveyor 298 driven by the motor 299. The screw conveyor discharges the material into the upper end of a drying tower 300 which has located in the upper part thereof the rotary chopping devices 301. The material then drops by gravity through the tower 300 and is mingled with hot air which is introduced through a conduit 302, this air being heated by the furnace in which the waste is burned, as hereinafter described. If it be found that the waste does not give sufficient heat for carrying on the process, coal or other fuel may be intermingled with the waste in the mill into which the waste passes from the tower and for this purpose a fuel hopper 303 is provided with its lower end communicating with the mill through a conduit 304.

The materials falling through the tower 300 are delivered by gravity into the rotary mill 305 which is similar in construction to the mill 281 and the other mills previously described. The shaft 306 of this mill has mounted thereon the rotary beaters 307 and the impeller 308 and it is operated by an electric motor 309. The finely divided and dried materials are discharged upwardly through the impeller 308 and conduit 310 which communicates with a fan 311 driven by the motor 312. The fan 311 discharges the materials through the conduit 313 which has a burner 314 on the discharge end thereof within the chamber of the furnace 315. The dried material is burned in the furnace chamber as it is discharged through the conduit and the air for primary combustion is supplied by the conduit 302, previously referred to, which communicates with the drying tower 300. The air passing to the conduit 302 is heated in the space 316 which lies between the double walls of the furnace, the conduit 302 being connected with this space at one side of the furnace while at the other side the furnace is provided with an opening 317 through which the air may be drawn in from the atmosphere. Additional air for secondary combustion may be supplied through a conduit 318 which leads through the hollow division wall 319 of the furnace. The ash produced by the combustion of the materials in the furnace chamber drops through the opening 320 formed in the bottom wall of the furnace which is constructed in the shape of an inverted cone. The gases of combustion pass upwardly from the furnace chamber through a conduit 321 which communicates with a separating device 322 by which the ash is separated and discharged downwardly through an opening 323. The gases pass upwardly from the separator 322 with a portion thereof passing into the conduit 279 which communicates with the drying tower 277, as previously described. The remaining portion of the gases from the separator 322 pass upwardly to the stack 324 and are wasted to the atmosphere. The conduit 293 is also connected to convey the gases from the separator 289 and discharge them into this stack. As in the other forms of the invention, the driving motors for operating the screw conveyors, the rotary mills and the exhaust fans may be provided with an interlocking electrical system so that the feeding of the wet waste into a rotary mill into which hot gases or hot air are introduced is prevented in addition to preventing the feeding of the waste when the exhaust fans are not in operation and the introduction of hot gases into the first stage mill when the screw conveyor 275 is not feeding waste to that mill.

In Fig. 7 there is illustrated another form of the invention which differs from those previously described in that the first stage of the drying operation is effected by a drier of the perforated belt or screen type, in addition to which means are provided for effecting the drying either by hot air produced in the hollow wall of the furnace or by heated gases produced by a preheater. In this form, the sewage waste containing a large percent of water is introduced, as before, into the tank of a rotary vacuum filter 330 of the construction previously described. The solid material, including some water, is scraped off of the rotary cylinder by the scraper 330ª and is discharged into a hopper 331 which feeds it onto one end of an endless perforated belt 332ª constituting a part of the drier 332. A series of compartments 332ᵇ are mounted beneath the upper stretch of the belt and are adapted to discharge through the belt heated air or gas which is supplied through a series of branch conduits 332ᶜ leading from a supply conduit 333. A hood 332ᵈ is mounted over the upper stretch of the perforated belt and is adapted to catch the heated air and gases which pass upwardly through the finely divided waste material moving over the belt, thus effecting a substantial drying of this material as it moves toward the discharge end of the drier, where it is received in a hopper 334. The heated air, vapors and gases collected in the hood 332ᵈ pass upwardly through a conduit 335 and are drawn off by a fan 336 which is driven by a motor 337 and which discharges into a conduit 338 leading to the furnace or to one of the preheaters, as hereinafter described.

The hopper 334 discharges into a variable speed screw conveyor 339 which is driven by a motor 340. The materials are discharged by the screw conveyor into the upper end of a drying tower 341 which is similar to those previously described and which is provided in the upper part thereof with the rotary power driven cutters 342 adapted to effect a further subdivision of the waste material as it passes between them. The drying tower 341 is adapted to receive heated air through a conduit 343 leading from the hollow wall of the furnace and it may also receive heated gases through another conduit 343 fed by one of the preheaters hereinafter described. These two conduits 343 and 344 may have dampers 345 and 346 connected therein, respectively, for shutting off the flow through either one when desired. The finely divided waste material drops through the tower 341 into the rotary drying mill 347 which is similar in construction and operation to those previously described, being provided with a shaft 348 driven by the motor 349 and having the rotary beaters 350 and the impeller 351 mounted thereon. The finely divided and dried material is delivered upwardly by the impeller 351, along with the vapors, air and gases, through a conduit 352 which communicates with the intake of a rotary fan 353 driven by a motor 354. The material discharged by the fan 353 is conveyed through the conduit 355 to the interior of the furnace 356 where it is burned continuously as it is discharged from the mouth of the conduit through a suitable burner. The air for primary combustion is supplied through the conduit 343 leading to the tower 341 and if the waste is not of sufficient heating value to supply the necessary heat for carrying on the various steps of the process, coal or other fuel may be added through a hopper 357 which is mounted above the mill 348 and arranged to communicate with the mill through a conduit 358.

The furnace 356 has a hollow wall construction providing an inner space 356ª into which air is drawn through an opening 359. This inner heating space is connected with the conduit 343 previously described so that a quantity of air is continuously heated during the operation of the furnace and supplied to the drying tower 341. As the waste burns in the furnace, the ash is dropped through the opening 360 in the tapered bottom wall of the furnace and the gases of combustion pass upwardly through a conduit 361 which leads into the casing of a preheater 362. The casing of the preheater 362 is connected by a conduit 363 with a second preheater 364 from which the gases of combustion are passed through a conduit 365 by a fan 365ª to a separator 366 by which the finely divided ash is separated and dropped downwardly through a conduit 366ª while the gases pass upwardly through an outlet 366ᵇ. The first preheater 362 includes a coil 367 which is connected at its lower end with a fan 368 driven by a motor 369 and adapted to draw in air from the atmosphere through a conduit 370. This air is circulated through a coil 367 of the preheater and is then discharged into the previously described conduit 333 by which heated air is supplied to the drier 332. This conduit 333 may be connected by a conduit 371 with the previously described conduit 343 by which heated air is supplied to the tower 341 and a damper 372 may be located in this interconnecting conduit so that, when desired, the preheater may be employed for supplying heated air both to the drier 332 and the tower 341. If the preheater 362 is not in operation, heated air may be supplied through the conduit 343 to the drying tower 341 and also to the perforated belt drier 332.

The conduit 338 which conveys heated air, gases and vapors from the hood of the drier 332 communicates with the furnace chamber through the hollow division wall 356ᵇ, thus supplying additional air for combustion, and at the same time destroying the obnoxious character of the vapors which are drawn off in the drier 332. The conduit 338 is connected by a branch conduit 374 with the coil 375 of the second preheater 364 and a portion of the hot air, vapors and gases is thus heated by the preheater and is then discharged into the previously described conduit 344 which leads to the drying tower 341. The conduit 344 communicates with a conduit 376 having a branch 378 leading from the conduit 338 and the lower end of this conduit 376 communicates with the furnace chamber, thus supplying additional air for combustion. The drier 332 is adapted to be driven by an electric motor which may be connected along with the other motors of the system in an electric circuit such as that illustrated in Figs. 2 and 2ª so that there is an interlocking control of the actuation of all of the motors to prevent damage to any parts of the apparatus when other parts of the apparatus are accidentally shut down.

In Fig. 8 of the drawings, there is illustrated another form of the invention. In this form, the waste containing a large percentage of water is introduced into the rotary vacuum filter 380 which is similar to those previously described and from which the wet waste material is removed by a scraper 380ª and discharged into a hopper 381. The hopper discharges the material onto the perforated belt 382ª of a drier 382 which has a series of compartments 382ᵇ located beneath the upper stretch of the belt and adapted to discharge through the belt a quantity of heated air which is received by the compartments through branch conduits 382ᶜ leading from a supply conduit 383 adapted to receive heated air from a preheater heated by the gases of combustion, as hereinafter described. The drier 382 is provided with a hood 382ᵈ which collects the air and vapors passing upwardly from the waste on the belt 382ª and discharges it through a conduit 385 connected with a fan 386 which is driven by a motor 387 and which discharges the hot air and vapors into a conduit 388 adapted to convey the vapors either to the furnace or to a preheater, as hereinafter described. The waste which is partially dried in passing over the compartments 382ᵇ on the perforated belt is discharged into a hopper 389 through which it falls by gravity into a rotary screw conveyor 390 driven by the motor 391. The screw conveyor discharges the materials into a drying tower 392 which has power driven rotary chopping devices 393 located in the upper part thereof. Hot air and vapors adapted to effect a further drying of the waste are introduced into the tower 392 through a conduit 394 and additional fuel for combustion may be supplied and mixed with the waste in the wall below the tower by means of a hopper 395 and a connecting conduit 396.

The finely divided material falling through the tower 392 is discharged into the rotary drying mill 397 which is similar in construction to those previously described, being provided with a shaft 398 which is driven by a motor 399 and which has mounted thereon the rotary beating devices 400 and the impeller 401. The impeller 401 discharges the waste material, hot air, vapors and the like upwardly through a conduit 403 which is connected with a fan 404 driven by a motor 405. The fan 404 is rotated to discharge the materials from a conduit 406 into the combustion chamber of a furnace 407 where the materials are burned as they are supplied, the air for primary combustion being furnished to the tower 392 by the conduit 394 heretofore referred to. Additional air for combustion, along with the objectionable gases from the drying apparatus 382, is supplied to the furnace 407 through the previously mentioned conduit 388 which extends through the top wall of the furnace. The ash resulting from the combustion in the furnace chamber drops through the opening 408 at the bottom and the gaseous products pass upwardly through a conduit 409 which leads to a separator 410. In this separator, the finely divided ash which may be carried in suspension is separated and falls by gravity through the lower opening 410ᵃ, while the gases move upwardly through a conduit 411 to a preheater 412. In this preheater, there is located a coil 413 through which air is forced by a fan 414 driven by a motor 415. The air which is heated in this coil passes to the conduit 383, which has previously been described as supplying heated air to the pans 382ᵇ which are located beneath the perforated belt of the dryer 382. The hot gases of combustion, after passing through the preheater 412, continue upwardly through another conduit 416 to a second preheater 417 in which there is located a heating coil 418. This coil is connected by a conduit 419 with the conduit 388 so that a portion of the hot air and gases passing off from the dryer 382 may be passed through the preheater 417 and heated to a further extent before being supplied from the coil 418 through the conduit 394 to the drying tower 392. The gases of combustion pass upwardly from the preheater 417 through a conduit 420 which is connected to the intake of a fan 421 driven by a motor 422 and adapted to discharge the gases through a stack 423 to the atmosphere. The furnace shown with this form of the invention embodies means for generating steam, consisting of a number of water tubes 424 which are located within the refractory walls of the furnace and connected with headers 425 and a steam drum 426 in which the generated steam may be collected and then drawn off through a pipe 427. In this form of the invention, as in those previously described, the various motors for operating the drying apparatus, the preheaters and the exhaust fans may be connected in an electrical system so that their operations are automatically controlled in the manner heretofore described.

In Figs. 9 and 10 of the drawings, there is illustrated another modification of the invention in which the preliminary drying operation is effected by a rotary kiln and in which the heat generated by the combustion of the waste products is utilized somewhat differently from its utilization in the embodiments of the invention previously described. In this form, the waste material containing a large percentage of water, is introduced into the tank of a rotary vacuum type separator 438 comprising the usual drum 430ᵃ and a scraper 430ᵇ by which the solid material, containing some water, is removed from the screen of the drum and deposited in a hopper 431 through which it falls into the rotary screw conveyor 432 which is driven by a motor 433. The screw conveyor feeds the material into the upper end of a drying tower 434, similar to those previously described, which is provided in its upper part with rotary power driven chopping devices 435 by which the material is reduced to a finely divided state. Heated air for drying purposes is introduced into the upper part of the tower through a conduit 436 and the finely divided material falls through this heated air to the bottom of the tower where it is received by a rotary screw conveyor 437 driven by a motor 438. The screw conveyor 437 feeds the materials into a rotary drying kiln 440 which comprises a cylindrical steel shell 440ᵃ arranged to revolve around its longitudinal axis which is inclined downwardly from the inlet end. This shell is provided on its interior with longitudinal blades or vanes 440ᵇ which pick up material during the rotation of the shell and then drop it downwardly so that it is subjected to a thorough mixing with the current of hot air which passes through the shell during its rotation, the hot air being supplied from a tower 434 and the conduit 436. The shell is closed at its upper end by a stationary head or casing 440ᶜ and at its lower end it discharges into a tower or casing 441 in which the solid materials settle to the bottom and are collected by a rotary screw conveyor 442 which is driven by a motor 443. The upper end of the tower casing 441 communicates with a conduit 444 through which the hot air and gases are drawn off by a fan 445 driven by a motor 446. The fan discharges the hot air, gases and vapors through a conduit 447 which leads to a separator 448 of the type previously described. Any solid material in the gases is discharged through the opening 448ᵃ in the bottom of the separator and the gases and vapors are passed upwardly through a conduit 449 having connections hereinafter described for conveying the hot gases to the furnace where the objectionable odors are destroyed.

The solid material which is discharged by the rotary drying kiln is fed by the screw conveyor into the upper end of a drying tower 450 into which hot air may be introduced by a conduit 451 leading from the conduit 436 previously described. If desired, hot gases and vapors may also be introduced through a conduit 452 having a connection with the conduit 449, as hereinafter referred to. Power driven rotary chopping devices 453 are mounted in the upper part of the tower for effecting a further subdivision of the material before it drops downwardly through the hot air and gases in the tower. If desired, coal or other fuel may be introduced into the tower from a hopper 454 in order to provide additional heat for maintaining the system when the solid material is subsequently burned. From the tower 450, the solid material passes along with the hot air and gases and intermixed fuel into a rotary pulverizer and dryer 455 having the construction previously described, including a shaft 456 driven a motor 457 and having mounted thereon the rotary beating devices 458 and the impeller 459. The impeller discharges the finely divided material along with the hot air, vapors and gases upwardly through a conduit 460 which communciates with a fan 461 driven by a motor 462. The fan discharges the material upwardly through a conduit 463 which has its mouth 463ᵃ located within the chamber of a furnace 465 in which the solid material is burned as it is received in the furnace chamber.

The air for primary combustion is supplied from the tower 450 through the conduits 451 and 452 and additional air for combustion may be supplied through a branch conduit 466 which leads directly to the lower part of the furnace chamber from the conduit 452. Additional air may be supplied from a conduit 467 which leads downwardly through the hollow division wall 465ᵃ of the furnace and which supplies the hot air and gases to the conduit 452 and 466. The conduit 467 is connected with the coil 468 of a preheater 469 and the other end of this coil is connected with the conduit 449 which has previously been described as receiving the hot air and gases from the rotary drying kiln 440. The furnace is provided with a hollow wall 465ᵇ having an inner space 465ᶜ into which air is drawn from the atmosphere through ports 465ᵈ. This air is heated from the furnace chamber and passes upwardly through a conduit 470 which leads to the intake of a fan 471 driven by a motor 472. The fan discharges the hot air upwardly to the coil 473 of a preheater 474. The coil 473 is connected to the previously described conduit 436 by which the heated air is discharged into the tower 434. The hot gases of combustion are discharged from the furnace chamber through a conduit 475 which leads to a separator 476. In this separator, the finely divided material which may be carried by the gases is separated and discharged downwardly through a conduit 477, while the hot gases pass upwardly through a conduit 478 and into the preheater 474 where they serve to add additional heat to the hot air which passes through the coil 473. From the preheater 474, the hot gases of combustion pass upwardly through a conduit 479 to the previously described preheater 469 by which the hot gases and vapors received through the conduit 449 are heated. From the preheater 469, the gases pass upwardly through a conduit 480 to a separator 481. In this separator, any ash and the like which may remain in the hot gases is separated and discharged through an opening 481ª while the gases pass upwardly through a conduit 412 and are discharged to the atmosphere through a stack or the like. The ash which passes downwardly from the separator 476, adjacent the furnace, may be mixed with ash passing downwardly from the furnace through a conduit 483 and all of this ash may be continuously drawn off through suction devices or the like. As in the forms of the invention previously described, the various electric motors for operating different parts of the apparatus may be connected in an interlocking electrical system so that the apparatus may be operated and controlled as heretofore described to prevent injury to any parts of the apparatus and to maintain the proper operation of all of the parts regardless of the rate at which the sludge material is fed to the apparatus.

In addition to the foregoing embodiments of the invention, we have described and claimed in our copending divisional application, Ser. No. 170,465, filed October 22, 1937, another form of apparatus embodying the present invention and particularly adapted for use in disposing of garbage or a mixture of garbage and other waste materials, wherein means are provided for cleaning the gases and vapors before venting them to the atmosphere, and in our copending divisional application, Ser. No. 170,464, filed October 22, 1937, there is described and claimed still another form of the invention wherein the drying step of the process is carried on in a single mill constructed in the form of a rotary drum or kiln.

The various forms of apparatus herein described may be employed for disposing of sewage waste, garbage and other forms of waste, either separately or as mixtures of different forms of waste, and it is intended that the appended claims be so construed and that the term "sewage waste and the like" as used in the claims be interpreted to include any waste or mixture of wastes or other material or materials of high moisture content capable of treatment by the process and apparatus of the present invention. Where reference is made in the claims to the burning of the gases given off by or separated from the waste material, it is, of course, only the combustible gases which are burned, the remaining non-combustible gases being merely subjected to a heat treatment to deprive them of their obnoxious character. Also, where reference is made to the separation of the solid material of the waste from the residue, it is to be understood that the solid material is ordinarily wet when separated so that drying is desirable before the burning stage of the process is reached.

Although several forms of the improved apparatus of the present invention have been shown and described by way of illustration, it will be understood that the apparatus may be embodied in various other forms and that the improved method may be practiced in various ways coming within the scope of the appended claims.

We claim:

1. The method of treating sewage waste and the like, which consists in drying and comminuting the solid waste material, separating the comminuted solid material from the gases given off therefrom, effecting a further drying and a further comminution of said material, then burning said material and the combustible gases, and heat treating the non-combustible gases.

2. The method of treating sewage waste and the like, which consists in drying and comminuting the solid waste material, separating the comminuted solid material from the gases given off therefrom, effecting a further drying and a further comminution of said material, then burning said material and the combustible gases and heat treating the non-combustible gases, and utilizing the heat of combustion for drying a further quantity of the solid waste material.

3. The method of treating sewage waste and the like, which consists in comminuting the solid waste material, effecting the comminution and drying of said material in multiple stages, burning the comminuted and dried material from the last of said stages, and utilizing the heat of combustion for drying said material in each of said stages.

4. The method of treating sewage waste and the like, which consists in separating the solid waste material from the liquid, comminuting and drying said separated material in a series of stages, supplying dried material from one of said stages and mixing it with the wetter solid material in advance of the first one of said stages, and incinerating the comminuted and dried material received from the last of said stages.

5. The method of treating sewage waste and the like, which consists in separating the solid waste material from the liquid, comminuting and drying said separated material in a series of stages, supplying dried material from a later one of said stages and mixing it with the wetter solid material in an earlier one of said stages, incinerating the comminuted and dried material received from the last of said stages, and utilizing the heat of combustion for effecting the drying of said material in each of said stages.

6. The method of treating sewage waste and the like, which consists in separating the solid waste material from the liquid, effecting the comminution and drying of said separated material in a series of stages, separating the comminuted material from the gases given off therefrom after it has passed through the first of said stages and conveying the separated solid material to the next of said stages, and burning and heat treating said separated gases and the comminuted and dried material received from the last of said stages in a closed space.

7. The method of treating sewage waste and the like, which consists in separating the solid waste material from the liquid residue, effecting the comminution and drying of said separated material in a series of stages, separating the comminuted material from the gases given off therefrom after it has passed through the first of said stages and conveying the separated solid material to the next of said stages, incinerating the dried and comminuted material received from the last of said stages, and utilizing the heat of combustion for heating a quantity of said separated gases supplied for drying said material in one of said stages.

8. The method of treating sewage waste and the like, which consists in separating the solid waste material from the liquid residue, effecting the comminution and drying of said separated material in a series of stages, separating the comminuted material from the gases given off therefrom after it has passed through the first of said stages and conveying the separated solid material to the next of said stages, incinerating the dried and comminuted material received from the last of said stages, utilizing the heat of combustion for heating a quantity of said separated gases supplied for drying said material in one of said stages, burning said separated gases, and utilizing the heat produced by the combustion of said material and said gases for heating a quantity of air supplied to the first of said stages for drying purposes.

9. The method of disposing of sewage waste and the like, which consists in continuously feeding the solid waste material to a drier, causing a flow of hot gas to said material in said drier, comminuting said material while it is being dried in said drier, and regulating the flow of said hot gas in proportion to the supply of said waste material to said drier.

10. The combination in apparatus for disposing of sewage waste and the like, of means for separating the solid material from the liquid in the waste, means including a mill for pulverizing and drying said solid material, a furnace for burning said material, and means for conveying said material from said mill to said furnace.

11. The combination in apparatus for disposing of sewage waste and the like, of means for separating the solid material from the liquid in the waste, a drying tower through which said material passes, a mill for pulverizing and drying said material received from said tower, a furnace for incinerating said material, and means for conveying said pulverized and dried material to said furnace.

12. The combination in apparatus for disposing of sewage waste and the like, of means for separating the solid material from the liquid in the waste, a drying tower through which said material passes, a mill for pulverizing and drying said material received from said tower, a furnace for incinerating said material, means for conveying said pulverized and dried material to said furnace, means for utilizing the heat generated in said furnace for heating air and supplying it to said drying tower, and means for automatically controlling the flow of said hot air to said drying tower.

13. The combination in apparatus for disposing of sewage waste and the like, of means for separating the solid material in said waste from the liquid, drying means, means for conveying said material from said separating means to said drying means, means for pulverizing said material in said drying means, a furnace, and means for conveying said pulverized and dried material to said furnace.

14. The combination in apparatus for disposing of sewage waste and the like, of means for separating the solid material in the waste from the liquid, a drying tower adapted to receive said solid material from said separating means, means for comminuting said material in said drying tower, a mill adapted to receive said material from said drying tower, and a furnace adapted to receive and burn the solid material discharged from said mill.

15. The combination in apparatus for disposing of sewage waste and the like, of means for separating the solid material in the waste from the liquid residue, drying means, means for conveying said solid material to said drying means, means for mixing dried waste material with the wet waste material conveyed to said drying means, means for mixing and comminuting said wet and dried waste material in said drying means, means for pulverizing and effecting a further drying of said waste material, means for separating the gases from the pulverized solid material, a furnace, and means for conveying said separated solid material to said furnace.

16. The combination in apparatus for disposing of sewage waste and the like, of means for separating the solid material in the waste from the liquid residue, drying means, means for conveying said solid material to said drying means, means for mixing dried waste material with the wet waste material conveyed to said drying means, means for mixing and comminuting said wet and dried waste material in said drying means, means for pulverizing and effecting a further drying of said waste material, means for separating the gases from the pulverized solid material, a furnace, means for conveying said separated solid material to said furnace, and means for conveying said separated gases to said furnace.

17. The combination in apparatus for disposing of sewage waste and the like, of means for separating the solid material in the waste from the liquid residue, drying means, means for conveying said solid material to said drying means, means for mixing dried waste material with the wet waste material conveyed to said drying means, means for mixing and comminuting said wet and dried waste material in said drying means, means for pulverizing and effecting a further drying of said waste material, means for separating the gases from the pulverized solid material, a furnace, means for conveying said separated solid material to said furnace, and means for utilizing the heat generated in said furnace for heating air and conveying it to said drying means.

18. The combination in apparatus for disposing of sewage waste and the like, of means for separating the solid material in the waste from the liquid residue, drying means, means for conveying said solid material to said drying means, means for mixing dried waste material with the wet waste material conveyed to said drying means, means for mixing and comminuting said wet and dried waste material in said drying means, means for pulverizing and effecting a further drying of said waste material, means for separating the gases from the pulverized solid material, a furnace, means for conveying said separated solid material to said furnace, and means for utilizing the heat generated in said furnace for heating said separated gases.

19. The combination in apparatus for disposing of sewage waste and the like, of a series of pulverizing and drying mills, means for partially drying wet sewage waste and conveying it to the first mill of said series, means located between the first and the last mill of said series for separating the gases from the solid waste material and causing the solid waste material to be conveyed to the next mill of the series, a furnace, and means for conveying the pulverized and dried solid material from the last mill of said series to said furnace.

20. The combination in apparatus for disposing of sewage waste and the like, of a series of pulverizing and drying mills, means for partially drying wet sewage waste and conveying it to the first mill of said series, means located between the first and the last mill of said series for separating the gases from the solid waste material and causing the solid waste material to be conveyed to the next mill of the series, a furnace, means for conveying the pulverized and dried solid material from the last mill of said series to said furnace, means for utilizing the heat generated in said furnace by the combustion of said solid material in said furnace for heating said separated gases, and means for conveying said heated gases to one of the mills of said series.

21. The combination in apparatus for disposing of sewage waste and the like, of a drying tower, means for conveying wet waste material to said tower, means for comminuting said material in the upper end of said tower, means for heating said material in said tower, a pulverizing and drying mill adapted to receive said material from said tower, a furnace, and means including an exhaust fan for withdrawing pulverized and dried material from said mill and conveying it to said furnace.

22. The combination in apparatus for disposing of sewage waste and the like, of a drying tower, means for conveying wet waste material to said tower, a hot air conduit leading to said tower, a mill adapted to receive said material from said tower, a furnace, means for conveying said material from said mill to said furnace, and means for utilizing the heat generated by the burning of said material in said furnace for heating air and conveying it to said hot air conduit.

23. The combination in apparatus for disposing of sewage waste and the like, of a drying tower, means for conveying wet waste material to said tower, means for comminuting said material in said tower, a pulverizing and drying mill adapted to receive said material from said tower, means for exhausting the contents of said mill, a second pulverizing and drying mill, means for separating the gases from the pulverized and dried material exhausted from said first named mill, means for conveying said separated solid material to said second named mill, a furnace for burning said material, means for exhausting the contents of said last named mill and conveying it to said furnace, and means for utilizing the heat generated in said furnace for heating said separated gases.

24. The combination in apparatus for disposing of sewage waste and the like, of a drying tower, means for conveying wet waste material to said tower, means for comminuting said material in said tower, a pulverizing and drying mill adapted to receive said material from said tower, means for exhausting the contents of said mill, a second pulverizing and drying mill, means for separating the gases from the pulverized and dried material exhausted from said first named mill, means for conveying said separated solid material to said second named mill, a furnace for burning said material, means for exhausting the contents of said last named mill and conveying it to said furnace, means for utilizing the heat generated in said furnace for heating said separated gases, and means for conveying said heated gases to said second named mill and to said furnace.

25. The combination in apparatus for disposing of sewage waste and the like, of a drying tower, means for conveying wet waste material to said tower, means for comminuting said material in said tower, a pulverizing and drying mill adapted to receive said material from said tower, means for exhausting the contents of said mill, a second pulverizing and drying mill, means for separating the gases from the pulverized and dried material exhausted from said first named mill, means for conveying said separated solid material to said second named mill, a furnace for burning said material, means for exhausting the contents of said last named mill and conveying it to said furnace, and means for conveying said separated gases to the combustion chamber of said furnace.

26. The combination in apparatus for disposing of sewage waste and the like, of a pulverizing and drying mill, means for conveying the solid waste material to said mill, a second pulverizing and drying mill, means for exhausting the contents of said first named mill, means for separating the solid ingredients of said contents from the gases therein and conveying said solid ingredients to said second named mill, a furnace, and means for exhausting the contents of said second named mill and conveying them to said furnace to be burned.

27. The combination in apparatus for disposing of sewage waste and the like, of a pulverizing and drying mill, means for conveying the solid waste material to said mill, a second pulverizing and drying mill, means for exhausting the contents of said first named mill, means for separating the solid ingredients of said contents from the gases therein and conveying said solid ingredients to said second named mill, a furnace, means for exhausting the contents of said second named mill and conveying them to said furnace to be burned, and means for conveying said separated gases to said furnace.

28. The combination in apparatus for disposing of sewage waste and the like, of a pulverizing and drying mill, means for conveying the solid waste material to said mill, a second pulverizing and drying mill, means for exhausting the contents of said first named mill, means for separating the solid ingredients of said contents from the gases therein and conveying said solid ingredients to said second named mill, a furnace, means for exhausting the contents of said second named mill and conveying them to said furnace to be burned, means for utilizing a part of the heat generated in said furnace for heating said separated gases, and means for conveying a part of said heated gases to the combustion chamber of said furnace and for conveying the remainder of said heated gases to said last named mill.

29. The combination in apparatus for disposing of sewage waste and the like, of a pulverizing and drying mill, means for conveying the solid waste material to said mill, a second pulverizing and drying mill, means for exahusting the contents of said first named mill, means for separating the solid ingredients of said contents from the gases therein and conveying said solid ingredients to said second named mill, a furnace, means for exhausting the contents of said second named mill and conveying them to said furnace to be burned, and means for supplying additional fuel to said second named mill.

30. The combination in apparatus for disposing of sewage waste and the like, of a drying chamber, means for feeding waste material to said chamber, means for introducing hot gases into said chamber, and means for automatically stopping the flow of said hot gases upon stoppage of said feeding means.

31. The combination in apparatus for disposing of sewage waste and the like, of a drying mill, means for driving said mill, means for feeding waste material to said mill, and means for automatically stopping said feeding means upon stoppage of said driving means.

32. The combination in apparatus for disposing of sewage waste and the like, of a drying mill, means for feeding waste material to said mill, means for introducing hot gases into said mill, means for driving said mill, and means for automatically stopping said feeding means and stopping said flow of hot gases to said mill upon stoppage of said driving means.

33. The combination in apparatus for disposing of sewage waste and the like, of a drying chamber, feeding means for introducing waste material to said chamber, a motor for driving said feeding means, means for introducing hot gases into said chamber, a damper for controlling the flow of said hot gases, and means for automatically closing said damper upon stoppage of said motor.

34. The combination in apparatus for disposing of sewage waste and the like, of a drying mill, a motor for driving said mill, feeding means for introducing waste material into said carrier, a motor for driving said feeding means, means for introducing hot gases to said mill, a damper for controlling the flow of said hot gases, and means for automatically closing said damper and stopping said last named motor on stoppage of said first named motor.

35. The combination in apparatus for disposing of sewage waste and the like, of a drying mill, a motor for driving said mill, a conveyor for supplying waste material to said mill, a motor for driving said conveyor, means for exhausting the dried material from said mill, a motor for driving said exhausting means, and means for automatically stopping said first and second named motors upon stoppage of said last named motor.

36. The combination in apparatus for disposing of sewage waste and the like, of a drying mill, a motor for driving said mill, means for supplying waste material to said mill, a furnace for burning the material dried in said mill, a heater for heating air and gases, means for conveying the hot gases of combustion from said furnace to said heater, means including a motor for inducing a flow of said gases of combustion through said last named means, and means operated automatically by the stoppage of said last named motor for arresting the operation of said first named motor.

37. The combination in apparatus for disposing of sewage waste and the like, of a drying mill, means for feeding waste material to said mill, means for exhausting the dried material from said mill, means for separating the solid dried material from the gases given off therefrom, means for causing a flow of said separated gases from said separating means, and means for arresting the operation of said first, second and third named means upon stoppage of said means for exhausting the gases from said separating means.

38. The combination in apparatus for disposing of sewage waste and the like, of a drying mill, a motor for driving said mill, means for supplying hot gases to said mill, a damper for shutting off the flow of said gases, feeding means for supplying waste material to said mill, a motor for driving said feeding means, means for exhausting the dried material from said mill, a motor for driving said exhausting means, and means for automatically stopping the operation of said first and second named motors and closing said damper upon stoppage of said last named motor.

39. The combination in apparatus for disposing of sewage waste and the like, of a drying mill, a motor for driving said mill, feeding means for supplying waste material to said mill, a motor for driving said feeding means, means for exhausting the dried material from said mill, a motor for driving said exhausting means, a separator for receiving said dried material from said exhausting means and separating the gases from the solid material, a fan for removing said gases from said separator, a motor for driving said fan, and means actuated automatically upon the stoppage of said last named motor for stopping all of said other motors.

40. The combination in apparatus for disposing of sewage waste and the like, of a drying mill, means for feeding waste material to said mill, means for exhausting the waste material from said mill and separating the gases from the solid material, means for further drying and then burning said solid material, and means for destroying the objectionable character of said gases and then allowing them to waste to the atmosphere.

41. The combination in apparatus for disposing of sewage waste and the like, of means for separating the solid material from the liquid residue of the waste, a drier having an endless belt over which said solid material is moved and subjected to the action of hot air, a drying tower, means for delivering said solid material from said belt to said drying tower, a drying mill for receiving said material from said tower, a furnace, and means for exhausting said material from said mill and delivering it to said furnace.

42. The combination in apparatus for disposing of sewage waste and the like, of means for separating the solid material from the liquid residue of the waste, a drier having an endless belt over which said solid material is moved and subjected to the action of hot air, a drying tower, means for delivering said solid material from said belt to said drying tower, a drying mill for receiving said material from said tower, a furnace, means for exhausting said material from said mill and delivering it to said furnace, and means for utilizing the heat of combustion generated in said furnace for heating air and delivering it to said dryer.

43. The combination in apparatus for disposing of sewage waste and the like, of means for separating the solid material from the liquid residue of the waste, a drier having an endless belt over which said solid material is moved and subjected to the action of hot air, a drying tower, means for delivering said solid material from said belt to said drying tower, a drying mill for receiving said material from said tower, a furnace, means for exhausting said material from said mill and delivering it to said furnace, means for utilizing the heat of combustion generated in said furnace for heating air and delivering it to said dryer, and means heated by the gases of combustion generated in said furnace for delivering hot gases to said drying tower.

44. The method of disposing of waste mate-

45. The method of disposing of waste material of high moisture content, consisting in subjecting the material to a first drying process in the presence of heated gases to remove a portion of the moisture, venting the moisture laden gases, subjecting the partially dried material to a second drying process in the presence of preheated air and then burning the solid and gaseous products derived from the second drying process.

46. The method of disposing of waste material of high moisture content, consisting in subjecting the material to a first drying process in the presence of heated gases to remove a portion of the moisture, venting the moisture laden gases, subjecting the partially dried material to a second drying process in the presence of preheated air and then burning the solid and gaseous products of combustion as heated gases for the first drying process, and utilizing the gaseous products of combustion as heated gases for the first drying process.

47. The method of disposing of waste material of high moisture content, consisting in subjecting the material to a first drying process in the presence of heated gases to remove a portion of the moisture, venting the moisture laden gases, subjecting the partially dried material to a second drying process in the presence of preheated air and then burning the solid and gaseous products derived from the second drying process, removing the ash from the products of combustion and utilizing the gaseous products of combustion as heated gases for the first drying process.

48. The method of disposing of waste material of high moisture content, consisting in mixing the incoming wet material with similar material which has been partially dried, subjecting the mixture to a first drying process, separating the moisture laden gases and venting the gases, returning the moisture laden gases, returning a portion of the partially dried material to be mixed with the incoming wet material, subjecting the remainder of the partially dried material to a second mill-drying process in the presence of preheated air, transporting the dried material in suspension in the air and then burning these mixed products, the gaseous products of combustion being utilized as the heated gases for the first drying process.

51. An apparatus for disposing of waste material of high moisture content comprising a pair of mills each including pulverizing means operable in a pulverizing chamber and means for conducting heated gases through the mill, apparatus for mixing the incoming wet material with similar material which has been partially dried, means for introducing the mixture into the first mill, a separator, means for transporting the pulverized and partially dried material from the mill in suspension in the heated gases to the separator, means for venting the moisture laden gases from the separator, means for conveying a portion of the partially dried material from the separator into the mixing apparatus, and for projecting the remainder into the second mill and combustion apparatus, and the second mill and combustion furnace to be burned therein, and means for introducing gaseous products of combustion from the furnace into the first mill.

52. The method of disposing of waste material of high moisture content consisting in mixing the material with previously dried material to reduce the proportionate moisture content of the mixture, drying the mixture in the presence of heated gases, returning a portion of the dried material to the mixing process, burning the remainder of the dried material, and utilizing the gaseous products of combustion as heated gases for the drying process.

53. The method of disposing of waste material of high moisture content consisting in mixing the material with previously dried material to reduce the proportionate moisture content of the mixture, pulverizing and drying the material in the presence of heated gases, burning the dried material from the ...

54. The method of...

material from the gases, returning a portion of the dried material to the mixing process, burning the remainder of the dried material, removing ash from the products of combustion, and utilizing the gaseous products of combustion for the drying process.

55. The method of disposing of waste material of high moisture content consisting in mixing the material with previously dried material to reduce the proportionate moisture content of the mixture, pulverizing and drying the mixture in the presence of heated gases, separating the dried material from the gases, returning a portion of the dried material to the mixing process, transporting the remainder of the dried material into a combustion space in suspension in a gas stream, burning this mixture in the combustion space, removing ash from the products of combustion, and utilizing the gaseous products of combustion as heated gases for the drying process.

56. An apparatus for disposing of waste material of high moisture content comprising a furnace for burning pulverized material, a pulverizing and drying mill, a separator, a mixer, means for conducting a stream of hot combustion gases from the furnace through the mill and the separator, material pulverized and dried in the mill being conducted into the separator in suspension in the gas stream and deposited in the separator, means for introducing the raw wet material into the mixer, means for introducing a portion of the dried material from the separator into the mixer, means for introducing the mixture into the mill, and means for transporting the remainder of the pulverized material from the separator into the furnace in suspension in a stream of gas.

57. The method of disposing of waste material of high moisture content which comprises the steps of mixing the material with previously dried material to reduce the proportionate moisture content of the mixture, drying the mixture in the presence of a heated drying fluid, returning a portion of the dried material to mix with the incoming wet material in the mixing stage of the process, burning the remainder of the dried material, and utilizing the heat of combustion of said material for maintaining the supply of said heated drying fluid.

58. The method of disposing of waste material of high moisture content which comprises the steps of mixing the wet material with previously dried material to reduce the proportionate moisture content of the mixture, subdividing and drying the mixture while carried in suspension in a heated drying fluid, returning a portion of the dried material to the mixing process, and burning the remainder of the dried material.

59. The combination in apparatus for disposal of sewage waste and the like, of means for separating the solid material from the liquid in the waste, a drying mill, means for conveying the separated material in suspension in a heated drying fluid to and through said mill, a furnace, and means for conveying the dried material to said furnace.

WILLIAM A. DUNDAS.
PHILIP HARRINGTON.